United States Patent
Oh et al.

(10) Patent No.: US 10,241,818 B2
(45) Date of Patent: Mar. 26, 2019

(54) IN-MEMORY VIRTUAL DESKTOP SYSTEM

(71) Applicant: Electronics and Telecommunications Research Institute, Daejeon (KR)

(72) Inventors: Soo-Cheol Oh, Daejeon (KR); Dae-Won Kim, Daejeon (KR); Sun-Wook Kim, Gyeonggi-do (KR); Seong-Woon Kim, Chungcheongnam-do (KR); Jong-Bae Moon, Daejeon (KR); Byeong-Thaek Oh, Daejeon (KR); Jung-Hyun Cho, Daejeon (KR); Hag-Young Kim, Daejeon (KR); Myeong-Hoon Oh, Daejeon (KR); Ji-Hyeok Choi, Gyeonggi-do (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 132 days.

(21) Appl. No.: 15/049,582

(22) Filed: Feb. 22, 2016

(65) Prior Publication Data

US 2016/0364160 A1    Dec. 15, 2016

(30) Foreign Application Priority Data

Jun. 15, 2015  (KR) ........................ 10-2015-0084217

(51) Int. Cl.
  *G06F 9/455*    (2018.01)
(52) U.S. Cl.
  CPC ............... *G06F 9/45558* (2013.01); *G06F 2009/45562* (2013.01); *G06F 2009/45583* (2013.01)

(58) Field of Classification Search
  CPC ............ G06F 11/3664; G06F 12/0866; G06F 3/0641; G06F 9/45533; G06F 12/0238;
  (Continued)

(56) References Cited

U.S. PATENT DOCUMENTS

2011/0055299 A1*  3/2011  Phillips ............... G06F 9/45533
                                                        707/827
2011/0113206 A1*  5/2011  Heim .................... G06F 9/4418
                                                        711/162
(Continued)

FOREIGN PATENT DOCUMENTS

KR    10-2014-0077656 A    6/2014
KR    10-2014-0117994 A    10/2014

OTHER PUBLICATIONS

Myeong Ca Seob Kim et al., "A Proposal of Virtual System for In-memory based VDI," Jun. 2014, p. 966-967, Proceedings of Symposium of the Korean Institute of communications and Information Sciences, Korea.

(Continued)

*Primary Examiner* — Zhuo H Li
(74) *Attorney, Agent, or Firm* — Rabin & Berdo, P.C.

(57) ABSTRACT

Disclosed herein is an in-memory virtual desktop system, which stores a virtual desktop image in main memory in order to prevent a load from being concentrated on a disk, and operates a virtual desktop using the virtual desktop image. The disclosed system includes an in-memory virtual desktop system, including hardware including main memory for storing virtual desktop images, and a hypervisor for virtualizing resources of the hardware and providing virtualized resources to a virtual desktop.

16 Claims, 11 Drawing Sheets

(58) Field of Classification Search
CPC . G06F 2009/45562; G06F 2009/45583; G06F 2212/205; G06F 3/0619; G06F 3/0622; G06F 3/065; G06F 3/068; G06F 9/45558; G06F 3/0665; G06F 9/452; G06F 9/45537; G06F 17/30233; G06F 2212/222; G06F 11/0712; G06F 11/073; G06F 12/0842; G06F 2201/815
See application file for complete search history.

(56) References Cited

U.S. PATENT DOCUMENTS

| | | | |
|---|---|---|---|
| 2011/0131390 A1 | 6/2011 | Srinivasan et al. | |
| 2011/0265083 A1* | 10/2011 | Davis | G06F 12/0866 718/1 |
| 2013/0007737 A1 | 1/2013 | Oh et al. | |
| 2013/0332610 A1* | 12/2013 | Beveridge | G06F 9/45558 709/226 |
| 2014/0013045 A1 | 1/2014 | Crossland et al. | |
| 2014/0173171 A1 | 6/2014 | Chen et al. | |
| 2014/0297603 A1 | 10/2014 | Kim et al. | |
| 2014/0317223 A1 | 10/2014 | Park et al. | |
| 2015/0095597 A1* | 4/2015 | Ayanam | G06F 3/065 711/162 |
| 2016/0154710 A1* | 6/2016 | Wade | G06F 11/1469 714/19 |
| 2016/0378535 A1* | 12/2016 | Oh | G06F 9/4445 718/1 |

OTHER PUBLICATIONS

Taehoon Kim et al., "VDI Real-Time Monitoring System for KVM-Based Virtual Machine Resource Usage Analysis," Jan. 2015, p. 69-78, vol. 52, No. 1, Journal of the Institute of Electronics and Information Engineers, Korea.

Dongwoo Kang et al., "An Analysis of De-Duplication Model for Virtualization Environment," Jun. 2013, p. 136-138, Korea Computer Congress 2013, Korea Information Science Society, Korea.

* cited by examiner

| HYPERVISOR OPERATION MEMORY AREA | VIRTUAL MAIN MEMORY AREA | | | | VIRTUAL DISK AREA (VIRTUAL DESKTOP IMAGE) | | | | | |
|---|---|---|---|---|---|---|---|---|---|---|
| | VIRTUAL MAIN MEMORY 1 | VIRTUAL MAIN MEMORY 2 | ... | VIRTUAL MAIN MEMORY N | BLOCK | BLOCK | BLOCK | BLOCK | ... | BLOCK |

FIG. 4

IN-MEMORY VIRTUAL DESKTOP SYSTEM

CROSS REFERENCE TO RELATED APPLICATION

This application claims the benefit of Korean Patent Application No. 10-2015-0084217, filed Jun. 15, 2015, which is hereby incorporated by reference in its entirety into this application.

BACKGROUND OF THE INVENTION

1. Technical Field

The present invention generally relates to an in-memory virtual desktop system and, more particularly, to an in-memory virtual desktop system, which stores and operates a virtual desktop image in main memory.

2. Description of the Related Art

A virtual desktop system is technology for executing a plurality of virtual machines on a single physical server using virtualization technology and allowing clients, connected to the physical server over a network, to use the virtual machines. For this, a hypervisor generates logical resources from the physical resources of the server using virtualization technology and provides the logical resources to the virtual desktops. Representative physical resources include a Central Processing Unit (CPU), memory, and a disk. The virtual desktops are operated on logical resources and are transferred to a client through a virtual desktop transmission module.

A hypervisor generates a virtual disk from a physical disk using virtualization technology, and provides the virtual disk to a virtual desktop. The virtual desktop provides a service using the received virtual disk.

An environment in which an operating system (OS) and an application program for a virtual desktop are installed in a virtual disk is called a virtual desktop image. To boot and operate a virtual desktop, the virtual desktop image must always be accessed.

FIG. 1 illustrates a conventional system for storing and operating a virtual desktop image on a hard disk. In FIG. 1, a hypervisor 12 generates a virtual CPU 14a, virtual main memory 14b, and a virtual disk 14c based on a physical CPU 10a, main memory 10b, and a disk 10c, and provides the generated resources to each virtual desktop 14. The virtual desktop 14 is operated based on the virtual CPU 14a, the virtual memory 14b, and the virtual disk 14c.

The virtual desktop transmission module of the hypervisor 12 transmits the virtual desktop 14 to a client 16 over a network.

In a single virtual desktop server, several tens of virtual desktops 14 are operated. When all of the virtual desktops 14 simultaneously access the virtual desktop image, as in the case of virtual desktop booting, the load is concentrated on the disk 10c on which the virtual desktop image is stored, and thus a problem arises in that the performance of the entire system is deteriorated. In particular, the speed of the disk 10c becomes remarkably lower than that of other resources (CPU or memory) in the virtual desktop server, and thus the deterioration of system performance becomes even more serious.

As preceding technologies related to the present invention, U.S. Patent Application Publication Nos. 2014-0013045 (entitled "Non-Volatile RAM Disk"), 2014-0173171 (entitled "System and Method to Create a Non-Volatile Bootable RAM Disk"), and 2011-0131390 (entitled "Deduplication of Data on Disk Devices using Low-Latency Random Read Memory") are disclosed.

SUMMARY OF THE INVENTION

Accordingly, the present invention has been made keeping in mind the above problems occurring in the prior art, and an object of the present invention is to provide a in-memory virtual desktop system, which stores a virtual desktop image in main memory in order to prevent a load from being concentrated on a disk, and operates a virtual desktop using the virtual desktop image.

In accordance with an aspect of the present invention to accomplish the above object, there is provided an in-memory virtual desktop system, including hardware including main memory for storing virtual desktop images; and a hypervisor for virtualizing resources of the hardware and providing virtualized resources to a virtual desktop.

The main memory may include a hypervisor operation memory area, a virtual main memory area, and a virtual disk area.

The virtual disk area may store the virtual desktop images.

The hypervisor may include an in-memory disk virtualization engine for generating a virtual disk based on the main memory and providing the virtual disk to the virtual desktop; and an in-memory virtual desktop image management engine for backing up the virtual desktop images and loading backed-up virtual desktop images in the main memory.

The in-memory disk virtualization engine may include a virtual disk module unit for receiving and processing block-based read/write commands generated in the virtual disk; a block deduplication module unit for performing deduplication on blocks present in the virtual disk; and a memory-disk emulation module unit for performing read/write operations on the main memory in compliance with the read/write commands.

The virtual disk module unit may be configured to, when a read command generated in the virtual disk is "command (virtual desktop image ID, block ID, read)", convert the command (virtual desktop image ID, block ID, read) into a command (image pool block ID, read).

The image pool block ID may be generated using a formula "image pool block ID=start block ID+block ID of a given virtual desktop image in an image pool".

The block deduplication module unit may convert the command (image pool block ID, read) into a command (deduplication pool block ID, read) based on a deduplication table.

The deduplication table may include a deduplication pool block ID to which the image pool block ID is mapped.

The memory-disk emulation module unit may calculate a main memory block ID based on the deduplication pool block ID, convert the command (deduplication pool block ID, read) into a command (main memory block ID, read), convert the command (main memory block ID, read) into a command (main memory address, read), read data corresponding to a block size from the main memory address, and transfer read data to the virtual desktop.

The main memory address may be obtained using a formula "main memory address=start address of virtual disk main memory area+block size*main memory block ID".

The virtual disk module unit may be configured to, when a write command generated in the virtual disk is "command (virtual desktop image ID, block ID, write)", convert the command (virtual desktop image ID, block ID, write) into a command (image pool block ID, write).

The block deduplication module unit may be configured such that, if a block having content identical to that of a block desired to be written is not present in the deduplication pool of a deduplication table, an empty block is allocated from the deduplication pool, information about a block desired to be written is added to the deduplication table, and the command (image pool block ID, write) is converted into a command (deduplication pool block ID, write) using a newly allocated deduplication pool block.

The memory-disk emulation module unit may calculate a main memory block ID based on the deduplication pool block ID, convert the command (deduplication pool block ID, write) into a command (main memory block ID, write), convert the command (main memory block ID, write) into a command (main memory address, write), and write a block to the main memory address.

The in-memory virtual desktop image management engine may include a memory-disk storage module unit for storing virtual desktop images, present in the main memory, in a backup storage before the in-memory virtual desktop system is powered off; and a disk-memory loading module unit for loading virtual desktop images, present in the backup storage, in the main memory when the in-memory virtual desktop system is powered on.

The memory-disk storage module unit may copy an entire virtual disk area, present in the main memory, to the backup storage in a form of a single file.

The memory-disk storage module unit may store block i on the main memory as block i at a corresponding location in a backup file.

BRIEF DESCRIPTION OF THE DRAWINGS

The above and other objects, features and advantages of the present invention will be more clearly understood from the following detailed description taken in conjunction with the accompanying drawings, in which:

FIG. 4 is a diagram showing the structure of the main memory shown in FIG. 3;

DESCRIPTION OF THE PREFERRED EMBODIMENTS

Figure 1:
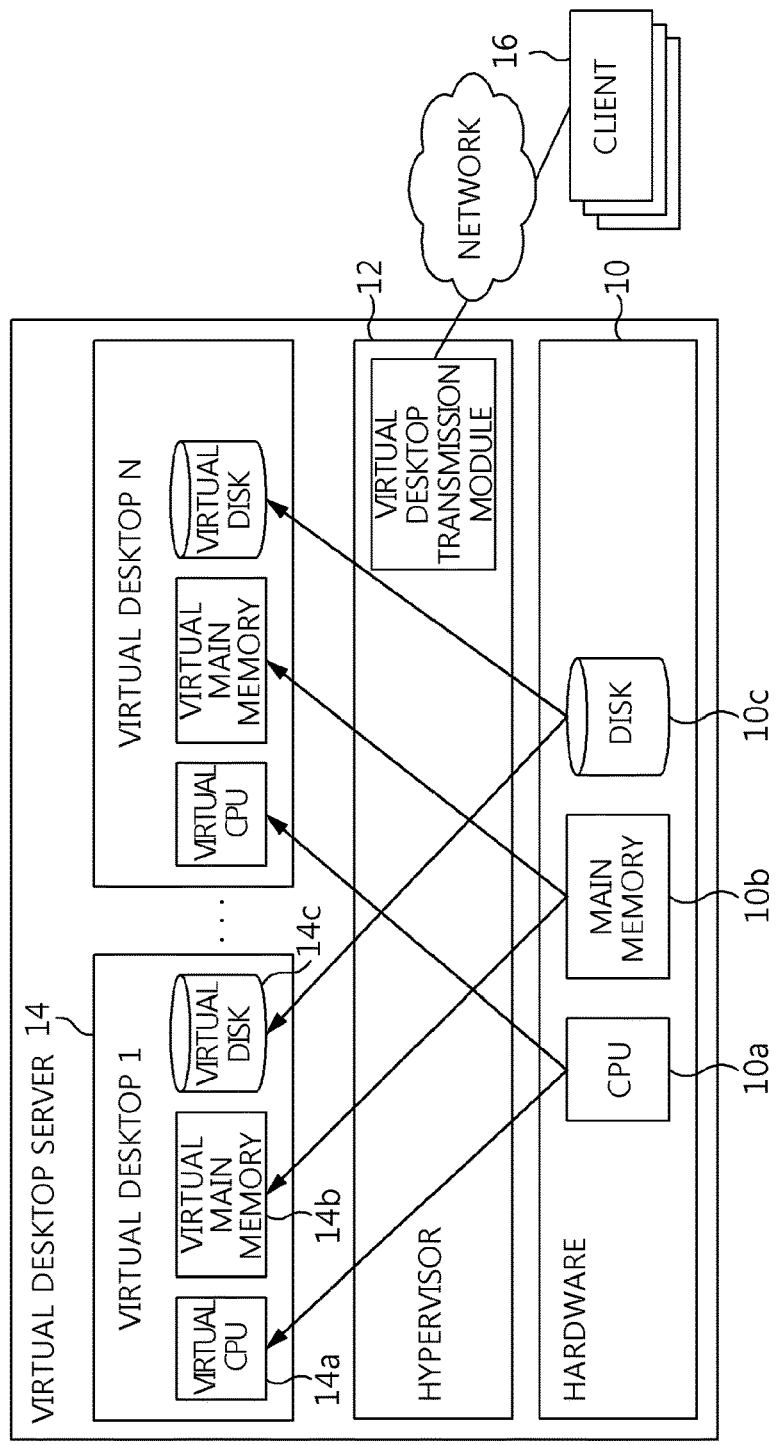
FIG. 1 is a configuration diagram showing a conventional hard disk-based virtual desktop system.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

Figure 2:
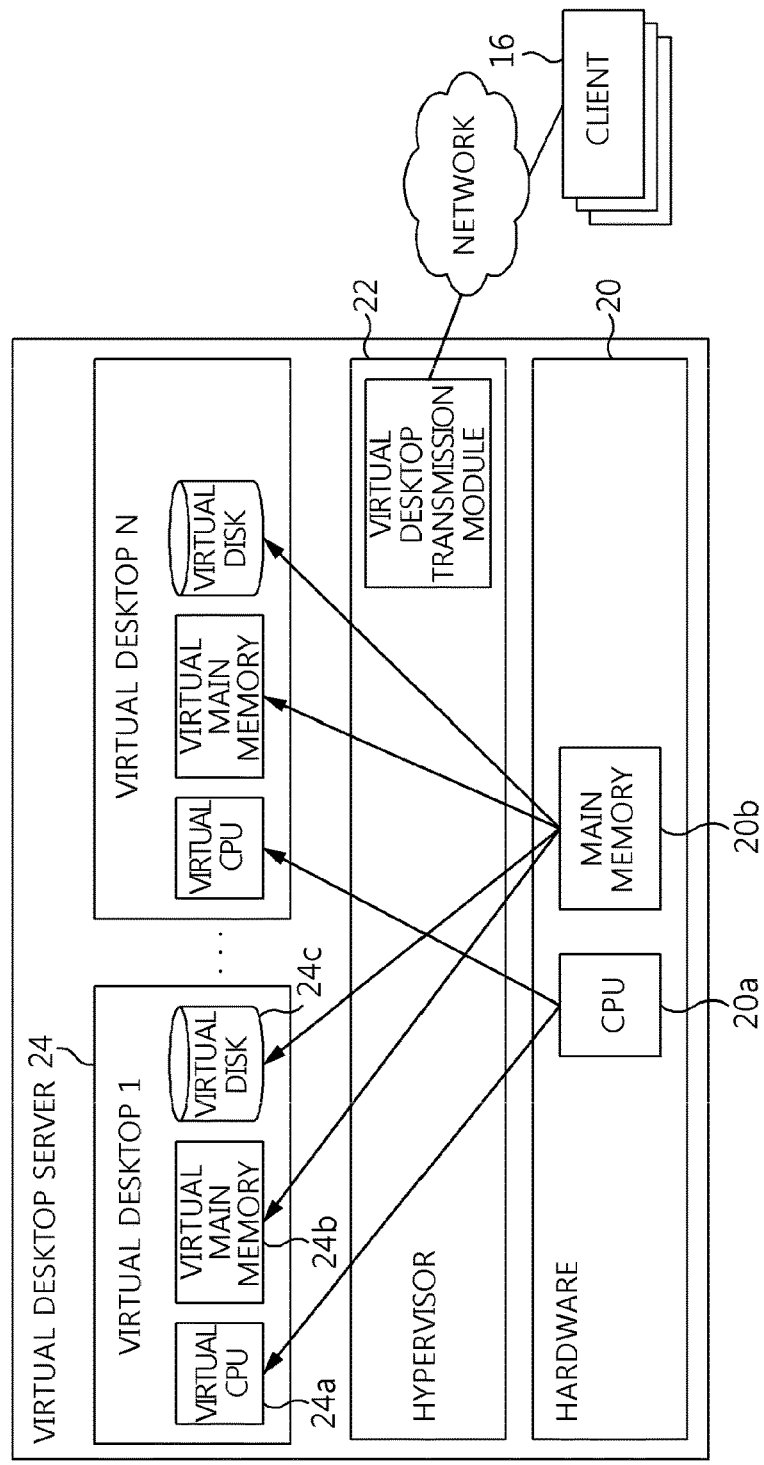
FIG. 2 is a schematic diagram showing a main memory-based virtual desktop system according to an embodiment of the present invention.

FIG. 2 is a schematic diagram showing a main memory-based virtual desktop system according to an embodiment of the present invention.

In FIG. 2, the scheme for generating a virtual CPU and virtual memory is identical to that of FIG. 1.

However, the scheme of FIG. 2 is different from that of FIG. 1 in that a virtual disk 24c is generated using main memory 20b, rather than a hard disk.

In FIG. 2, reference numeral 20 denotes hardware, reference numeral 22 denotes a hypervisor, and reference numeral 24 denotes a virtual desktop.

Figure 3:
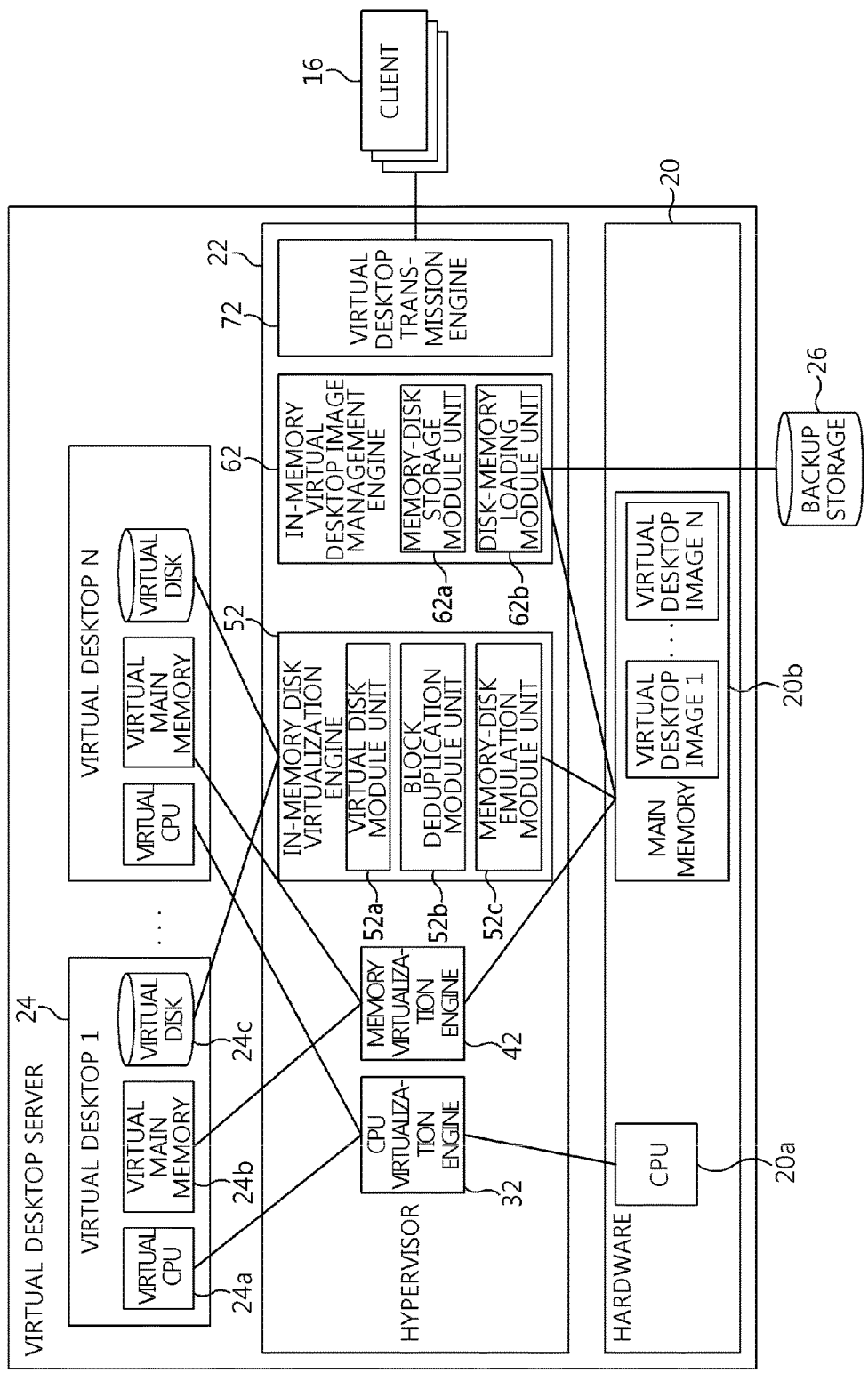
FIG. 3 is a diagram showing in detail the configuration of a main memory-based virtual desktop system according to an embodiment of the present invention.

FIG. 3 is a diagram showing in detail the configuration of a main memory-based virtual desktop system according to an embodiment of the present invention. The configuration shown in FIG. 3 may be referred to as an "in-memory virtual desktop system" or "in-memory virtual desktop server".

The main memory-based virtual desktop system according to the embodiment of the present invention includes hardware 20, a hypervisor 22, virtual desktops 24, and clients 16.

The hardware 20 includes a CPU 20a and main memory 20b as physical resources. Here, the main memory 20b stores multiple virtual desktop images (virtual desktop image 1 to virtual desktop image N).

The hypervisor 22 virtualizes the resources (CPU 20a and main memory 20b) of the hardware 20, and provides the virtualized resources to the virtual desktops 24. Here, the virtual desktops 24 may include multiple virtual desktops.

The virtual desktop 24 is operated based on virtual resources. Further, the virtual desktop 24 in operation is transmitted to the corresponding client 16 through the virtual desktop transmission engine 72 of the hypervisor 22.

The backup storage 26 is used as a storage device for backing up and recovering the virtual desktop images present in the main memory 20b.

The hypervisor 22 includes a CPU virtualization engine 32, a memory virtualization engine 42, an in-memory disk virtualization engine 52, an in-memory virtual desktop image management engine 62, and a virtual desktop transmission engine 72.

The CPU virtualization engine 32, which is an engine for virtualizing the CPU 20a of the hardware 20, is the same as the engine used by a conventional virtual desktop system.

The memory virtualization engine 42, which is an engine for virtualizing the main memory 20b of the hardware 20, is the same as the engine used by the conventional virtual desktop system.

The in-memory disk virtualization engine 52 generates a virtual disk 24c based on the main memory 20b, and provides the virtual disk 24c to the corresponding virtual desktop 24.

The in-memory disk virtualization engine 52 includes a virtual disk module unit 52a, a block deduplication module unit 52b, and a memory-disk emulation module unit 52c.

The virtual disk module unit 52a receives block-based read/write commands generated in the virtual disk 24c, and processes the block-based read/write commands using the block deduplication module unit 52b and the memory-disk emulation module unit 52c.

The block deduplication module unit 52b performs deduplication on the blocks present in the virtual disk 24c. By performing block-based deduplication, the physical size of all of the virtual desktop images may be reduced.

The memory-disk emulation module unit 52c actually performs read/write operations on the main memory 20b, which is accessible by address, in compliance with the read/write commands which are transmitted on a per-block basis. By means of such operation, virtual desktop images for the virtual desktops 24 are stored in the main memory 20b.

The in-memory virtual desktop image management engine 62 includes a memory-disk storage module unit 62a and a disk-memory loading module unit 62b.

Since the main memory 20b is volatile memory, pieces of data about the virtual desktop images (virtual desktop image 1 to virtual desktop image N) stored in the main memory 20b are lost when the virtual desktop server is powered off.

Therefore, the memory-disk storage module unit 62a stores the virtual desktop images, present in the main memory 20b, in the backup storage 26 before the virtual desktop server is powered off.

The disk-memory loading module unit 62b loads the virtual desktop images, stored in the backup storage 26, in the main memory 20b when the virtual desktop server is powered on.

FIG. 4 is a diagram showing the structure of the main memory 20b shown in FIG. 3.

In an embodiment of the present invention, the main memory 20b includes a hypervisor operation memory area, a virtual main memory area, and a virtual disk area.

The hypervisor operation memory area is the memory area necessary for the operation of the hypervisor 22.

The virtual main memory area is the area to be used for the virtual main memory for virtual desktops. In other words, the virtual main memory area includes virtual main memory 24b for all virtual desktops 24.

The virtual disk area is the area to be used for virtual disks for virtual desktops. In other words, in the virtual disk area, virtual desktop images are stored. Further, the virtual desktop images are provided to the virtual desktops 24 in the form of each virtual disk 24c by the in-memory disk virtualization engine 52.

Figure 5:
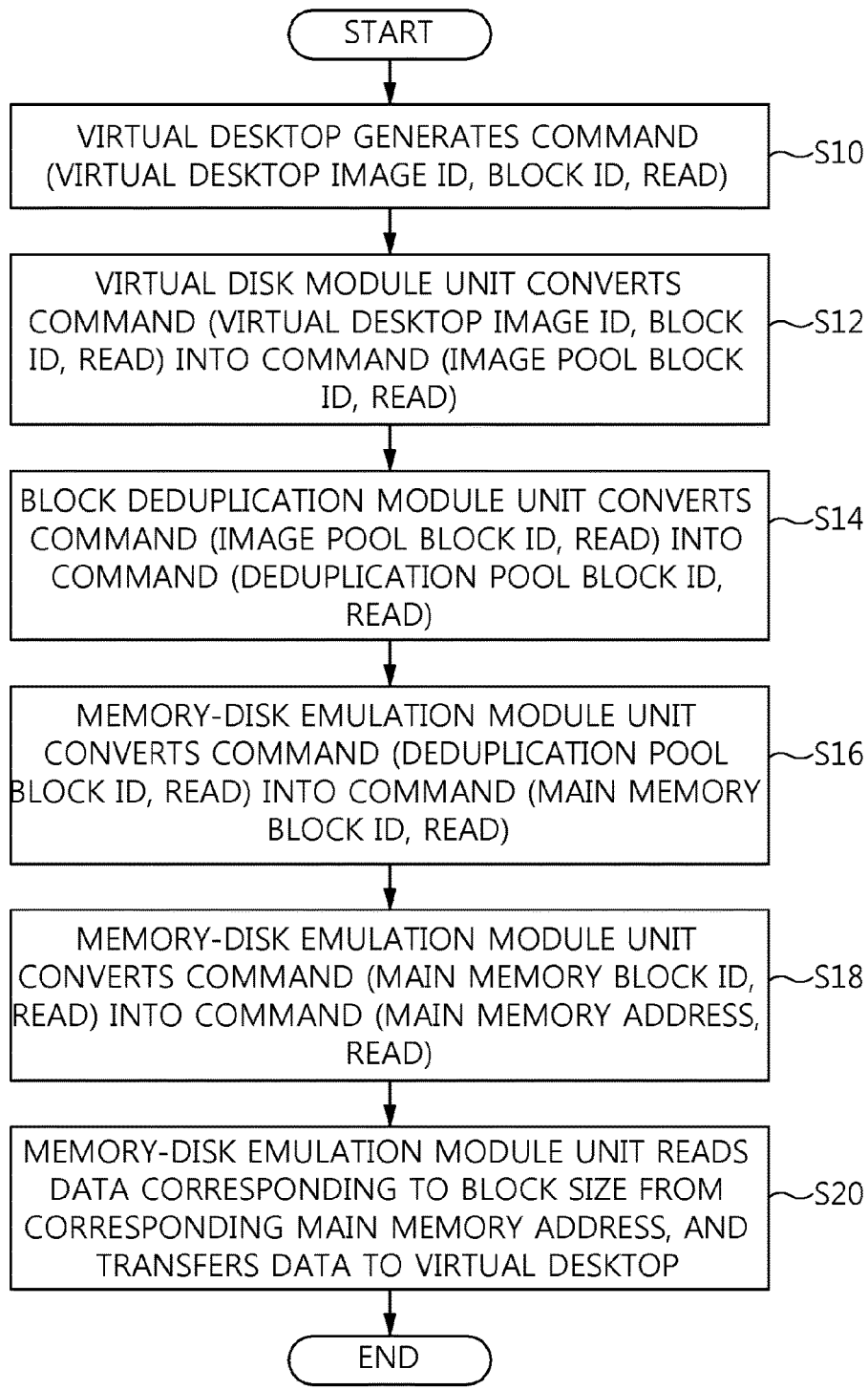
FIG. 5 is a flowchart showing a read procedure for the virtual disk shown in FIG. 3.

Next, a procedure for, when a read procedure for a block of the virtual disk 24c occurs in the virtual desktop 24, reading the block from the main memory 20b will be described. FIG. 5 is a flowchart showing a read procedure for the virtual disk shown in FIG. 3, FIG. 6 is a diagram employed in the description of read/write procedures for the virtual disk shown in FIG. 3, and FIG. 7 is a diagram showing a deduplication table employed in the embodiment of the present invention.

By way of example, a description is made on the assumption that a read procedure for block 1 in virtual desktop 2 occurs.

First, in the virtual desktop 24, when a read procedure for its own virtual disk 24c occurs, the virtual desktop 24 generates a read command and delivers it to the virtual disk module unit 52a at step S10. Here, the read command is represented by "(virtual desktop image ID, block ID, read)". In the above example, since the case where a read procedure for block 1 occurs in the virtual desktop 2 has been assumed, the read command may be represented by "(virtual desktop image 2, block 1, read)".

Figure 6:
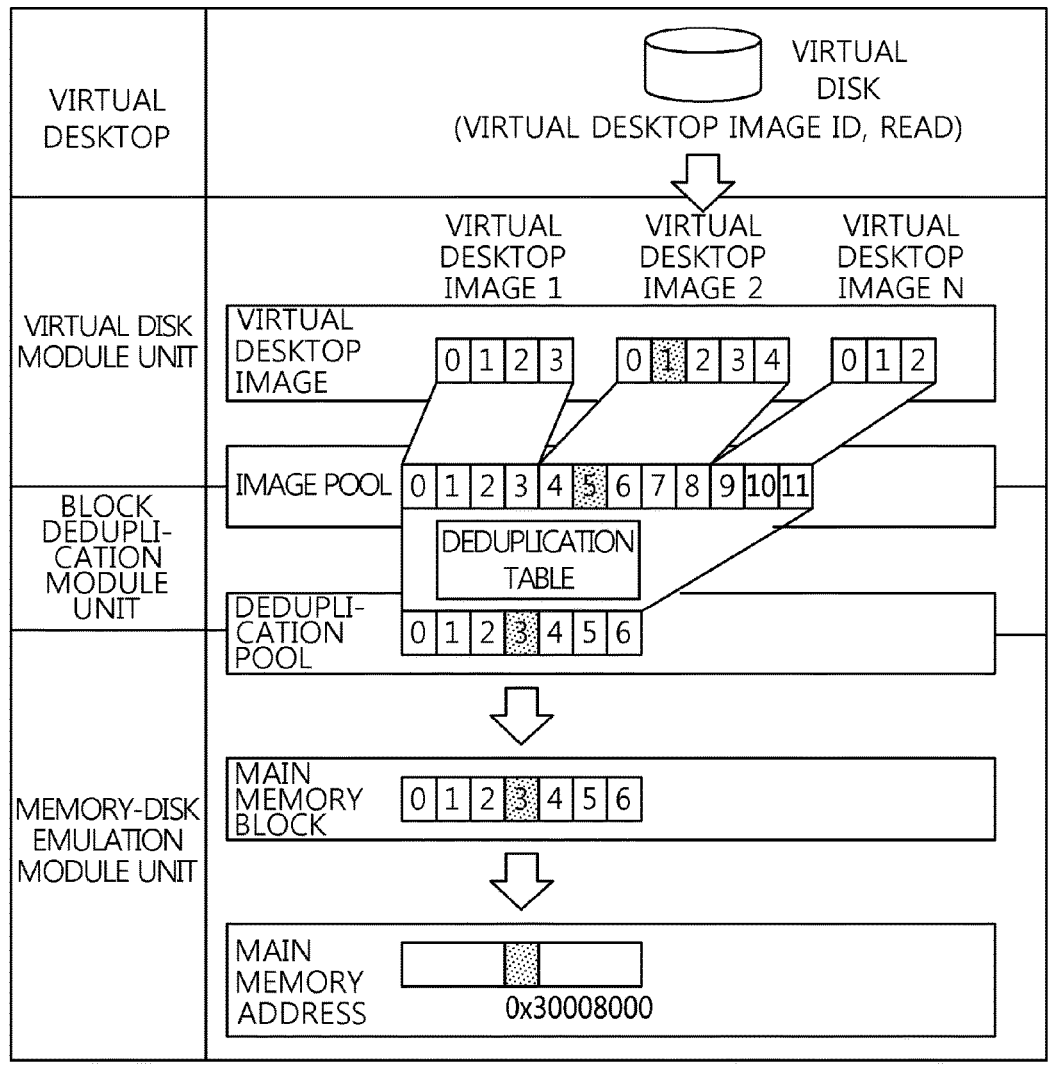
FIG. 6 is a diagram employed in the description of read/write procedures for the virtual disk shown in FIG. 3.
Figure 7:
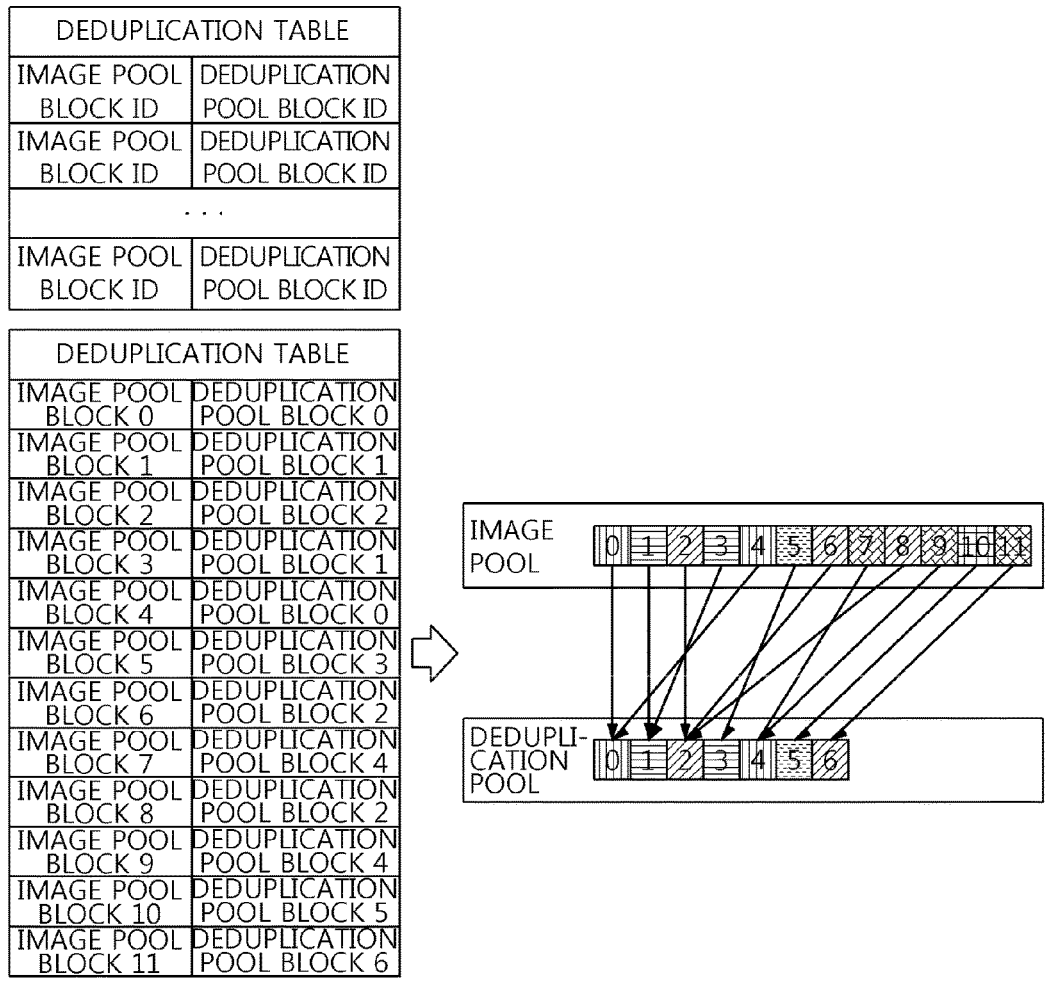
FIG. 7 is a diagram showing a deduplication table employed in the embodiment of the present invention.

Accordingly, the virtual disk module unit 52a maintains a single image pool in order to manage all virtual desktop images (see FIG. 6). In this case, the blocks in the single image pool have unique block IDs which are not duplicated. Therefore, the virtual disk module unit 52a converts the command (virtual desktop image ID, block ID, read) into the command (image pool block ID, read) at step S12. Here, the image pool block ID may be generated using, for example, the formula "image pool block ID=start block ID+block ID of the corresponding virtual desktop image in the image pool". Referring to FIG. 6, in the above example, the start block ID of virtual desktop image 2 is 4, and the block ID is 1 because the read procedure occurs for block 1 of the virtual desktop image 2. Therefore, the image pool block ID is 5. As a result, the command (virtual desktop image 2, block 1, read) is converted into the command (image pool block 5, read).

Thereafter, the block deduplication module unit 52b converts the command (image pool block ID, read) into the command (deduplication pool block ID, read) at step S14. When such conversion is performed, the deduplication table of FIG. 7 is used. The deduplication table is represented by "(image pool block ID, deduplication pool block ID)". That is, the block ID present in the image pool denotes the mapped block ID in the deduplication pool.

The image pool includes blocks present in all virtual desktop images, wherein blocks having the same content may be mapped to a single block of the deduplication pool. In FIG. 7, blocks having the same pattern shape may be represented by a block having the same content. For example, since block 0 and block 4 of the image pool have the same content, they may both be mapped to block 0 of the deduplication pool. Accordingly, the block deduplication module unit 52b converts, for example, the command (image pool block 5, read) into the command (deduplication pool block 3, read).

Thereafter, the memory-disk emulation module unit 52c calculates the main memory block ID using the deduplication pool block ID at step S16. Here, the main memory block ID is obtained by dividing the virtual disk area of the main memory 20b, which is accessible by address, into blocks so as to store the virtual desktop images in the main memory 20b on a per-block basis. An example of a method of calculating a main memory block ID from the deduplication pool block ID is a method using one-to-one mapping. That is, deduplication pool block i is mapped to main memory block i. For example, the command (deduplication pool block 3, read) is converted into the command (main memory block 3, read).

When the main memory block ID is calculated in this way, the memory-disk emulation module unit 52*c* calculates the address of the main memory 20*b* based on the main memory block ID at step S18. Here, an example of a method of calculating the address of the main memory 20*b* may be given using the formula "main memory address=start address of virtual disk main memory area+block size*main memory block ID".

Therefore, the memory-disk emulation module unit 52*c* converts the command (main memory block ID, read) into the command (main memory address, read).

When the address of the main memory is determined, the memory-disk emulation module unit 52*c* reads data corresponding to the block size from the corresponding main memory address, and transfers the data to the virtual desktop 24 at step S20. For example, the command (main memory block 3, read) is converted into the command (main memory address 0x30008000, read).

Figure 8:
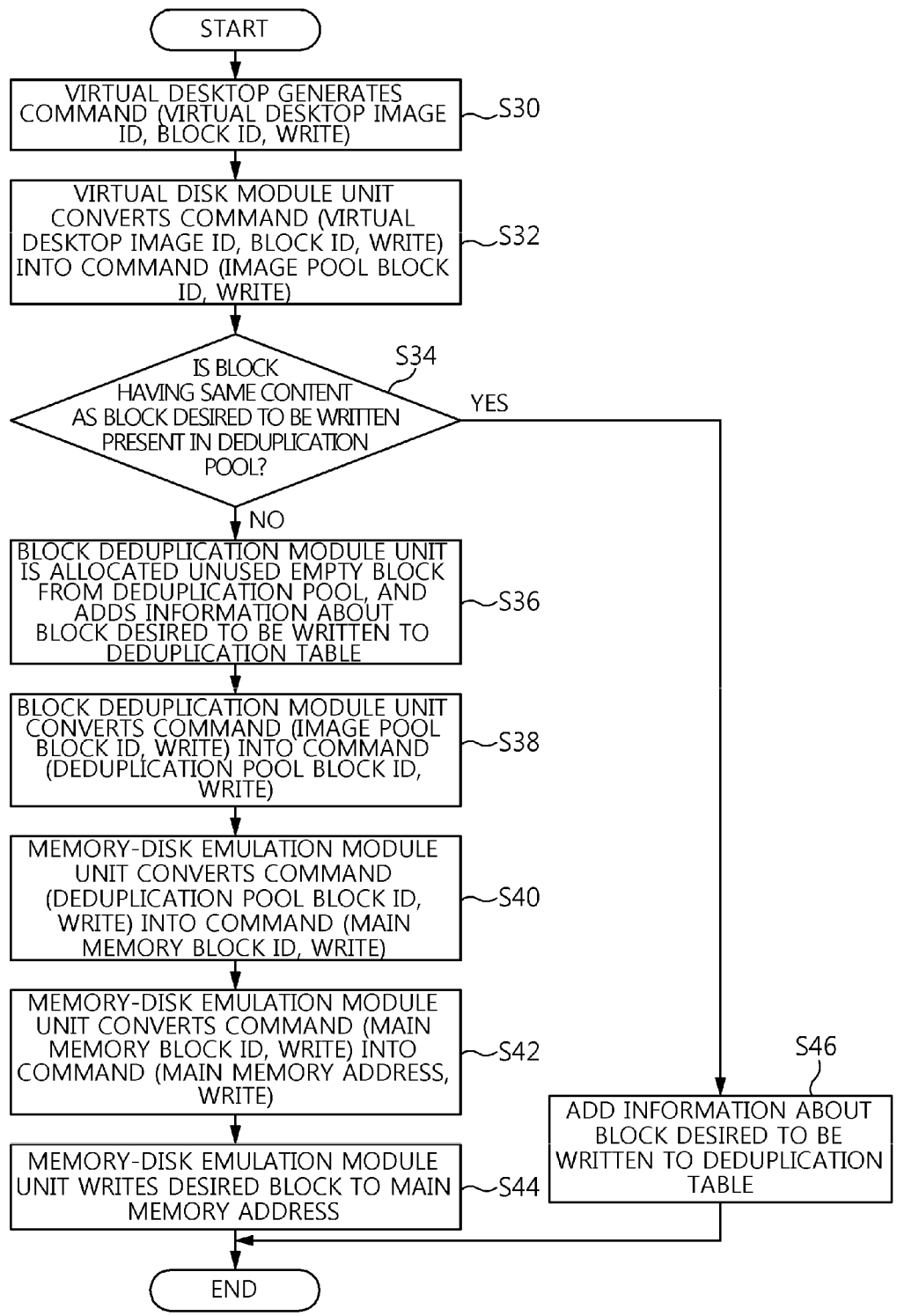
FIG. 8 is a flowchart showing a write procedure for the virtual disk shown in FIG. 3.

Next, a procedure in which the block of the virtual disk 24*c* is stored in the main memory 20*b* when a write operation for the block of the virtual disk 24*c* occurs in the virtual desktop 24 is described. FIG. 8 is a flowchart showing a write procedure for the virtual disk shown in FIG. 3.

When, in the virtual desktop 24, a write operation on its own virtual disk 24*c* occurs, the virtual desktop 24 generates a write command and delivers it to the virtual disk module unit 52*a* at step S30. Here, the write command is represented by (virtual desktop image ID, block ID, write).

Accordingly, the virtual disk module unit 52*a* converts the received command (virtual desktop image ID, block ID, write) into the command (image pool block ID, write) at step S32. The virtual disk module unit 52*a* delivers the command (image pool block ID, write) to the block deduplication module unit 52*b*.

Thereafter, the block deduplication module unit 52*b* checks whether a block having the same content as the block that is desired to be written is present in the deduplication pool at step S34.

If the block having the same content is found, the block deduplication module unit 52*b* adds information about the block desired to be written, that is, (image pool block ID, deduplication pool block ID), to the deduplication table at step S46.

If no block having the same content is found, the block deduplication module unit 52*b* is allocated an unused empty block from the deduplication pool and adds information about the block that is desired to be written to the deduplication table at step S36.

Thereafter, the block deduplication module unit 52*b* converts the command (image pool block ID, write) into the command (deduplication pool block ID, write) using the newly allocated block of the deduplication pool at step S38.

Next, the memory-disk emulation module unit 52*c* converts the command (deduplication pool block ID, write) into the command (main memory block ID, write) at step S40.

In addition, finally, the memory-disk emulation module unit 52*c* converts the command (main memory block ID, write) into the command (main memory address, write) at step S42.

When the address of the main memory is determined in this way, the memory-disk emulation module unit 52*c* writes the desired block to the corresponding main memory address at step S44.

Figure 9:
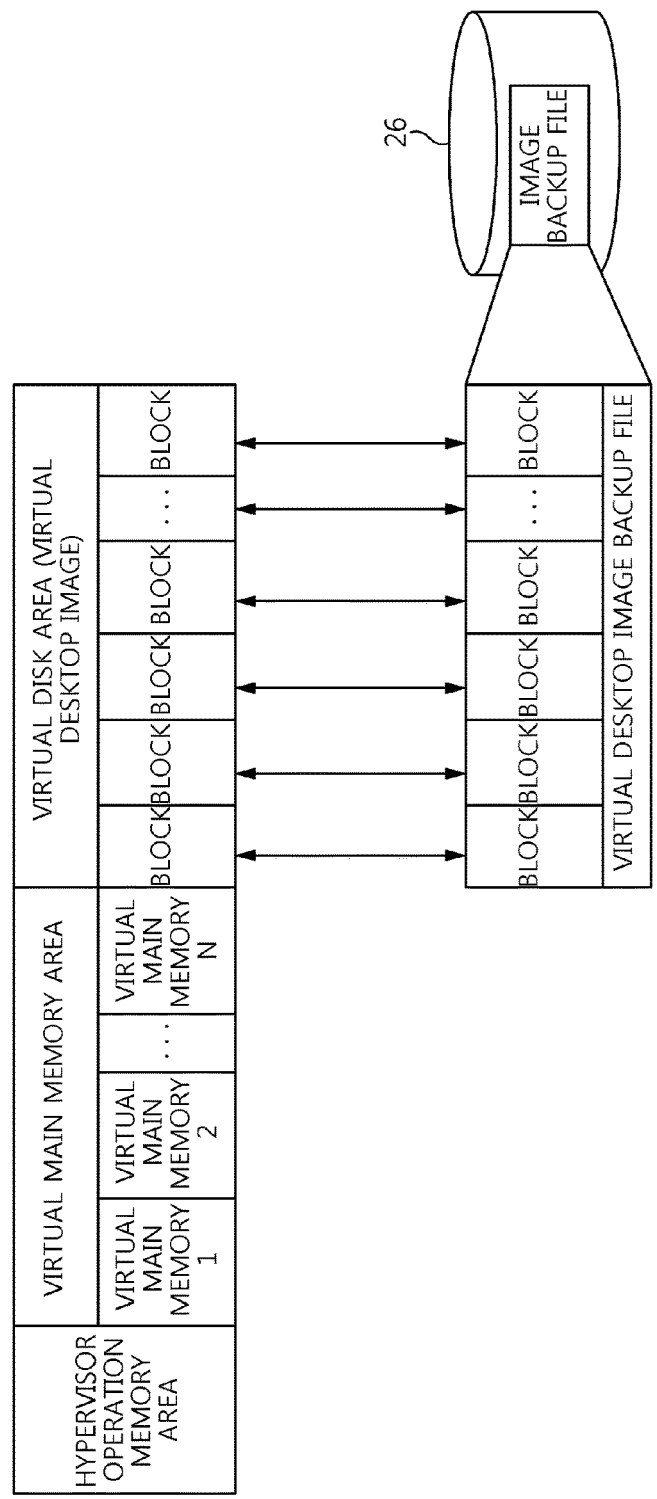
FIG. 9 is a diagram employed in the description of the storage and loading of a virtual desktop image in the main memory shown in FIG. 3.

Meanwhile, since the virtual disk area of the main memory 20*b* in which the virtual desktop images are stored is nonvolatile memory, the virtual desktop images are lost when the virtual desktop server is powered off. Therefore, the in-memory virtual desktop image management engine 62 performs a task of storing and loading the virtual disk area of the main memory 20*b* in the nonvolatile backup storage 26 (see FIG. 9). FIG. 9 is a diagram employed in the description of the storage and loading of the virtual disk images of the main memory 20*b* shown in FIG. 3.

The memory-disk storage module unit 62*a* of the in-memory virtual desktop image management engine 62 stores the virtual desktop images, present in the main memory 20*b*, in the backup storage 26 before the virtual desktop server is terminated. That is, the memory-disk storage module unit 62*a* copies the entire virtual disk area, stored in the main memory 20*b*, to the backup storage 26 in the form of a single file. Here, block i on the main memory is stored as block i at the corresponding location in the backup file.

Figure 10:
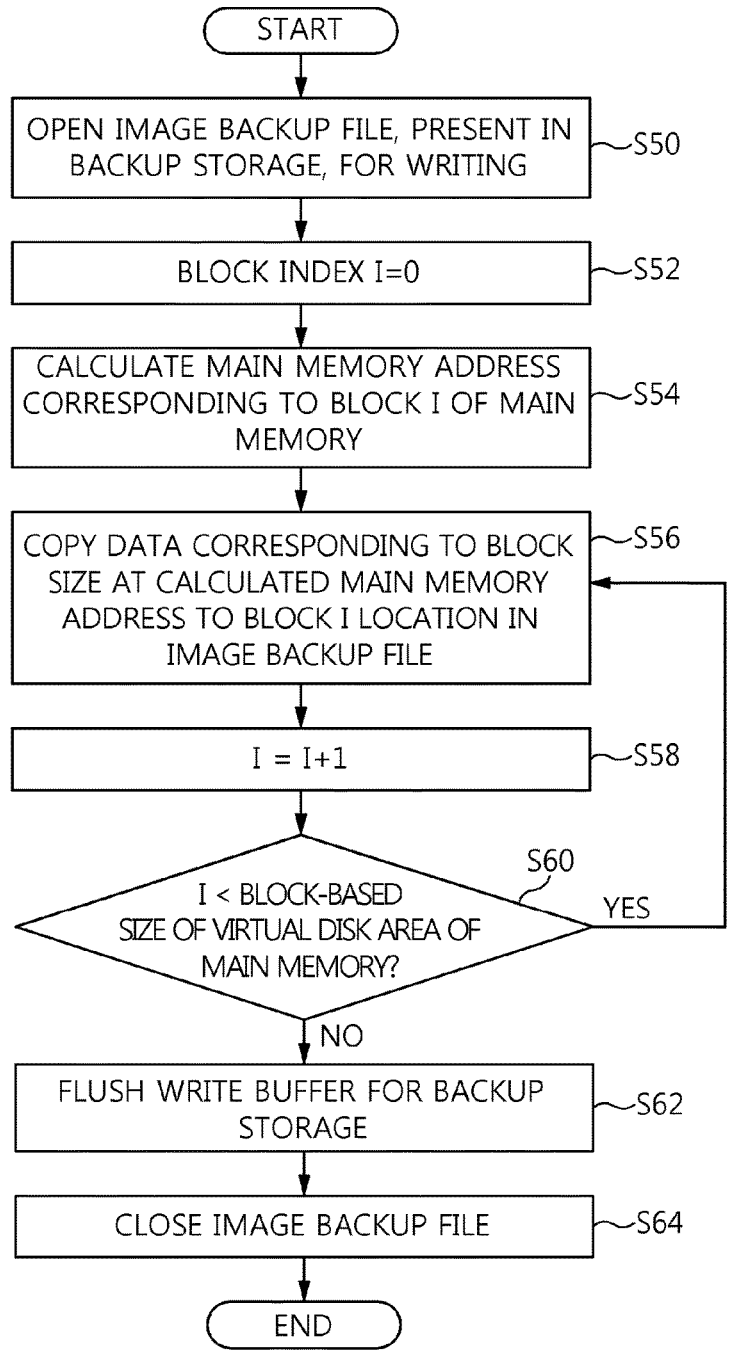
FIG. 10 is a flowchart showing the operation of the memory-disk storage module unit shown in FIG. 3.

FIG. 10 is a flowchart showing the operation of the memory-disk storage module unit 62*a* shown in FIG. 3.

First, an image backup file present in the backup storage 26 is opened for writing at step S50.

Thereafter, block index i is initialized to '0' at step S52.

Further, the address of the main memory corresponding to block i of the main memory 20*b* is calculated at step S54.

Thereafter, data corresponding to the block size at the calculated main memory address is copied to the location of block i in the image backup file at step S56. The procedure for copying block i is repeatedly performed a number of times corresponding to the block-based size of the virtual disk area of the main memory 20*b* at steps S58 and S60.

When all blocks of the main memory have been copied, a write buffer for image backup storage is flushed, and then all write operations are physically completed on the image backup file at step S62.

Thereafter, the image backup file is closed at step S64, and the storage procedure is terminated.

Figure 11:
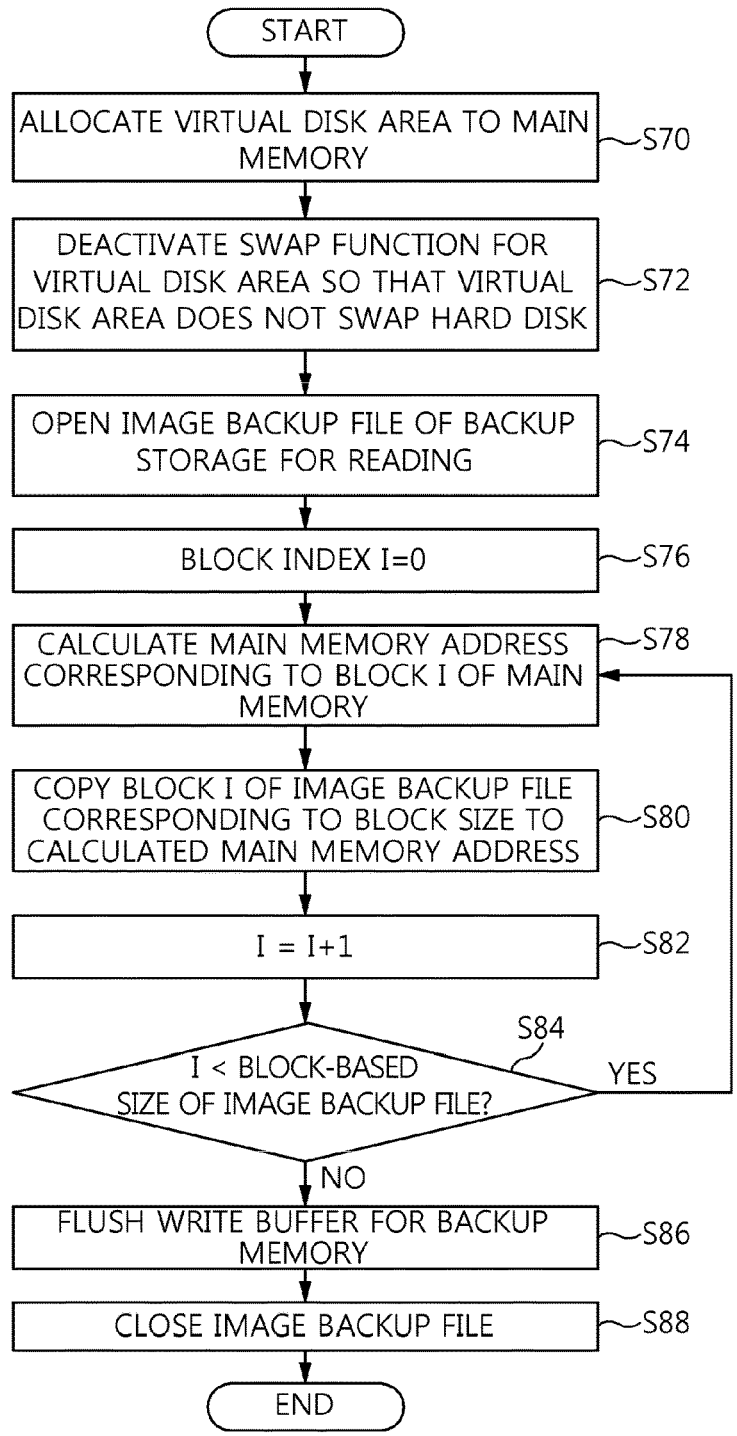
FIG. 11 is a flowchart showing the operation of the disk-memory loading module unit shown in FIG. 3.

FIG. 11 is a flowchart showing the operation of the disk-memory loading module unit 62*b* shown in FIG. 3.

First, a virtual disk area is allocated to the main memory 20*b* at step S70.

Thereafter, a swap function for a current area (i.e. virtual disk area) is deactivated so that the virtual disk area does not swap a hard disk at step S72.

Further, the image backup file present in the backup storage 26 is opened for reading at step S74.

Block index i is initialized to '0' at step S76.

The main memory address corresponding to block i of the main memory 20*b* is calculated at step S78.

Thereafter, block i of the image backup file is copied to the calculated main memory address so that data corresponding to the block size is copied at step S80. The procedure of copying block i is repeatedly performed a number of times corresponding to the block-based size of the image backup file at steps S82 and S84.

After all blocks of the image backup file have been copied, the write buffer for main memory is flushed, and then all write operations are physically completed on the main memory at step S86.

Thereafter, the image backup file is closed at step S88, and then the loading procedure is terminated.

In accordance with the present invention having the above configuration, a virtual desktop image is stored in main memory rather than a storage device, thus enabling a high-speed virtual desktop service to be provided.

By means of this, the present invention is advantageous in that, even if many read/write requests by virtual desktops for virtual disks occur simultaneously, high-speed processing in main memory is possible, thus improving the performance of the entire system.

As described above, optimal embodiments of the present invention have been disclosed in the drawings and the specification. Although specific terms have been used in the present specification, these are merely intended to describe the present invention and are not intended to limit the meanings thereof or the scope of the present invention as described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An in-memory virtual desktop system, comprising:
   hardware including main memory that stores a plurality of virtual desktop images; and
   a hypervisor for virtualizing resources of the hardware and providing virtualized resources to a plurality of virtual desktops,
   wherein the main memory is partitioned to include a hypervisor operation memory area, a virtual main memory area, and a virtual disk area,
   wherein the virtual disk area stores the virtual desktop images,
   wherein the hypervisor comprises an in-memory disk virtualization engine for generating a virtual disk based on the main memory and providing the virtual disk to a respective virtual desktop,
   wherein the in-memory disk virtualization engine includes an image pool to manage the plurality of virtual desktops, the image pool comprising virtual memory blocks for each of the plurality of virtual desktops, the virtual memory blocks each having a unique block ID,
   wherein the in-memory disk virtualization engine includes a block dededuplication module unit, and
   wherein the in-memory disk virtualization engine, based on receiving a command from one of the plurality of virtual desktops, generates a first command comprising the image pool block, and generates a deduplicated command to transmit to the main memory by mapping virtual memory blocks of the image pool having the same content to a same block of the deduplicated command.

2. The in-memory virtual desktop system of claim 1, wherein the hypervisor further comprises:
   an in-memory virtual desktop image management engine for backing up the virtual desktop images and loading backed-up virtual desktop images in the main memory.

3. The in-memory disk virtual desktop system of claim 2, wherein the in-memory disk virtualization engine further comprises:
   a virtual disk module unit for receiving and processing block-based read/write commands generated in the virtual disk; and
   a memory-disk emulation module unit for performing read/write operations on the main memory in compliance with the read/write commands.

4. The in-memory disk virtual desktop system of claim 3, wherein the virtual disk module unit is configured to, when a read command generated in the virtual disk is "command (virtual desktop image ID, block ID, read)", convert the command (virtual desktop image ID, block ID, read) into a command (image pool block ID, read).

5. The in-memory virtual desktop system of claim 4, wherein the image pool block ID is generated using a formula "image pool block ID=start block ID+block ID of a given virtual desktop image in an image pool".

6. The in-memory virtual desktop system of claim 5, wherein the block deduplication module unit converts the command (image pool block ID, read) into a command (deduplication pool block ID, read) based on a deduplication table.

7. The in-memory virtual desktop system of claim 6, wherein the deduplication table includes a deduplication pool block ID to which the image pool block ID is mapped.

8. The in-memory virtual desktop system of claim 6, wherein the memory-disk emulation module unit calculates a main memory block ID based on the deduplication pool block ID, converts the command (deduplication pool block ID, read) into a command (main memory block ID, read), converts the command (main memory block ID, read) into a command (main memory address, read), reads data corresponding to a block size from the main memory address, and transfers read data to the virtual desktop.

9. The in-memory virtual desktop system of claim 8, wherein the main memory address is obtained using a formula "main memory address=start address of virtual disk main memory area+block size*main memory block ID".

10. The in-memory virtual desktop system of claim 3, wherein the virtual disk module unit is configured to, when a write command generated in the virtual disk is "command (virtual desktop image ID, block ID, write)", convert the command (virtual desktop image ID, block ID, write) into a command (image pool block ID, write).

11. The in-memory virtual desktop system of claim 10, wherein the block deduplication module unit is configured such that, if a block having content identical to that of a block desired to be written is not present in the deduplication pool of a deduplication table, an empty block is allocated from the deduplication pool, information about a block desired to be written is added to the deduplication table, and the command (image pool block ID, write) is converted into a command (deduplication pool block ID, write) using a newly allocated deduplication pool block.

12. The in-memory virtual desktop system of claim 11, wherein the memory-disk emulation module unit calculates a main memory block ID based on the deduplication pool block ID, converts the command (deduplication pool block ID, write) into a command (main memory block ID, write), converts the command (main memory block ID, write) into a command (main memory address, write), and writes a block to the main memory address.

13. The in-memory virtual desktop system of claim 2, wherein the in-memory virtual desktop image management engine comprises:
   a memory-disk storage module unit for storing virtual desktop images, present in the main memory, in a backup storage before the in-memory virtual desktop system is powered off; and
   a disk-memory loading module unit for loading virtual desktop images, present in the backup storage, in the main memory when the in-memory virtual desktop system is powered on.

14. The in-memory virtual desktop system of claim 13, wherein the memory-disk storage module unit copies an entire virtual disk area, present in the main memory, to the backup storage in a form of a single file.

15. The in-memory virtual desktop system of claim 14, wherein the memory-disk storage module unit stores information in the main memory at a corresponding location in a backup file.

16. An in-memory virtual desktop system, comprising:
hardware including main memory that stores a plurality of virtual desktop images; and
a hypervisor for virtualizing resources of the hardware and providing virtualized resources to a virtual desktop,
wherein the hypervisor comprises an in-memory disk virtualization engine for generating a virtual disk based on the main memory and providing the virtual disk to a respective virtual desktop,
wherein the in-memory disk virtualization engine comprises a block deduplication module unit for performing deduplication on blocks present in a virtual disk generated based on the main memory,
wherein the main memory is partitioned to include a hypervisor operation memory area, a virtual main memory area, and a virtual disk area,
wherein the virtual disk area stores the virtual desktop images,
wherein the in-memory disk virtualization engine includes an image pool to manage the plurality of virtual desktops, the image pool comprising virtual memory blocks for each of the plurality of virtual desktops, the virtual memory blocks each having a unique block ID, and
wherein the in-memory disk virtualization engine, based on receiving a command from one of the plurality of virtual desktops, generates a first command comprising the image pool block, and generates a deduplicated command to transmit to the main memory by mapping virtual memory blocks of the image pool having the same content to a same block of the deduplicated command.

* * * * *